United States Patent [19]
Myers

[11] Patent Number: 5,878,651
[45] Date of Patent: Mar. 9, 1999

[54] TANDEM VACUUM BRAKE BOOSTER

[75] Inventor: Lawrence Robert Myers, South Bend, Ind.

[73] Assignee: Robert Bosch Technology Corporation, Broadview, Ill.

[21] Appl. No.: 999,378

[22] Filed: Feb. 19, 1997

[51] Int. Cl.[6] .............................. F01B 19/00; F15B 9/10
[52] U.S. Cl. ............................................ 92/48; 91/376 R
[58] Field of Search ...................... 92/48, 49; 91/376 R, 91/369.1

[56] References Cited

U.S. PATENT DOCUMENTS

| | | | |
|---|---|---|---|
| 5,000,002 | 3/1991 | Belart ...................................... | 92/48 X |
| 5,178,054 | 1/1993 | Shinohara et al. ...................... | 92/48 X |
| 5,357,846 | 10/1994 | Rudolph et al. ............................ | 92/48 |
| 5,507,216 | 4/1996 | Suwa ...................................... | 92/48 X |

*Primary Examiner*—Hoang Nguyen
*Attorney, Agent, or Firm*—Leo H. McCormick, Jr.; Warren Comstock

[57] ABSTRACT

A tandem brake booster having a housing with a first front chamber separated from a first rear chambers by a first wall and a second front chamber separated from a second rear chamber by a second wall. The first and second front chambers are connected to the first and second rear chambers through passages in a hub which retains a control valve. In a first or ready mode of operation, the first and second front and rear chambers have a substantially identical first fluid pressure while in a second or actuation mode of operation, the control valve responds to an input force to allow a second fluid pressure to be communicated to the first and second rear chambers and create a pressure differential with the first fluid in the first and second front chambers. The pressure differential develops an output force which moves the first and second walls as a function of the input force applied to the control valve. The control valve on termination of the input force returns to the first mode of operation as the second fluid pressure is replaced in the first and second rear chambers by the first fluid pressure. The hub member which retains the control valve has an axial bore. A junction is formed within the axial bore with first and second passages which connect the first front chamber with the first rear chamber to define a first flow path and with third and fourth passages which connect the second front chamber with the second rear chamber to define a second flow path. The first and second flow paths independently allow the second fluid pressure to be simultaneously evacuated from the first and second rear chamber as the control valve returns to the first or ready mode of operation.

10 Claims, 2 Drawing Sheets

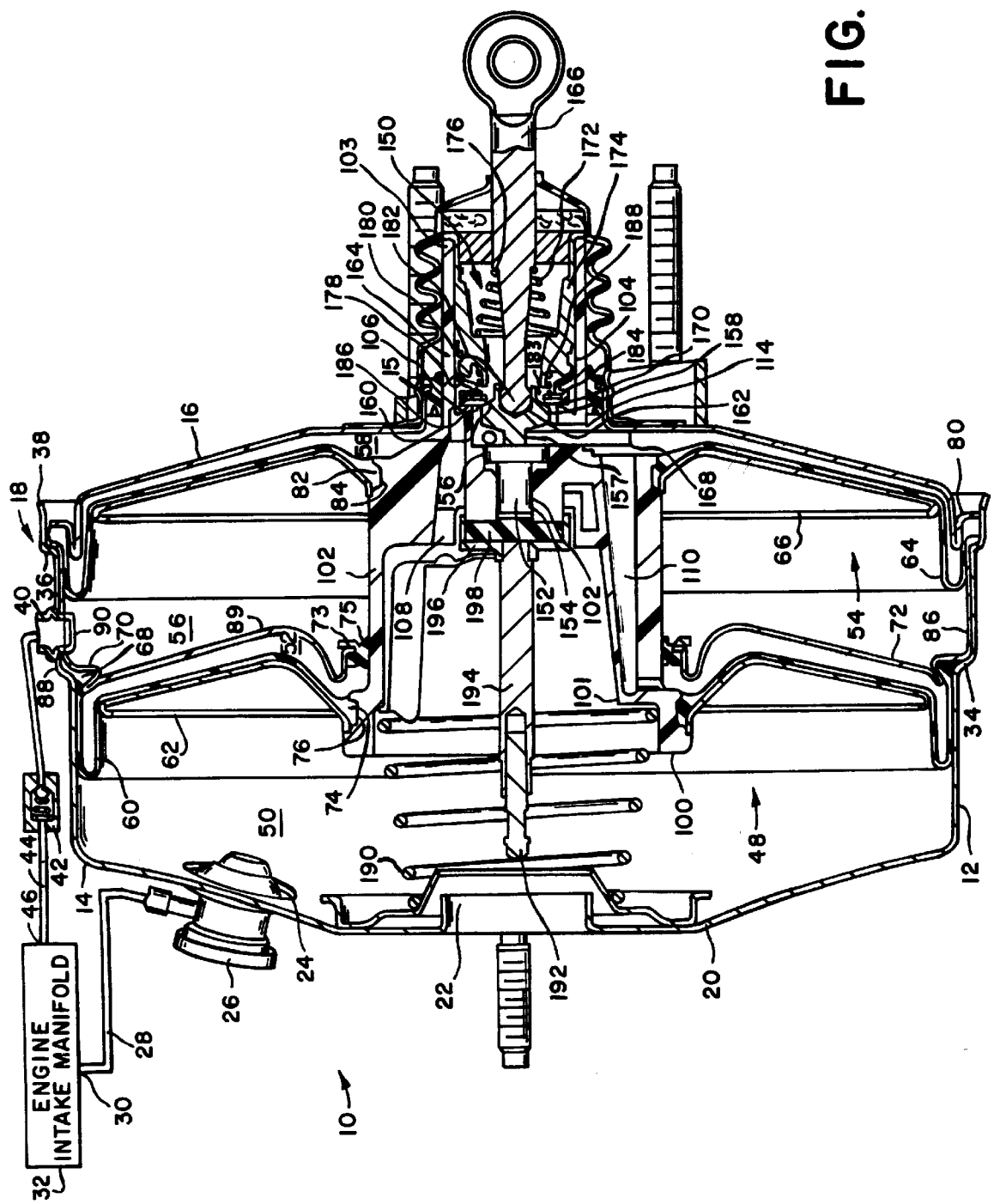

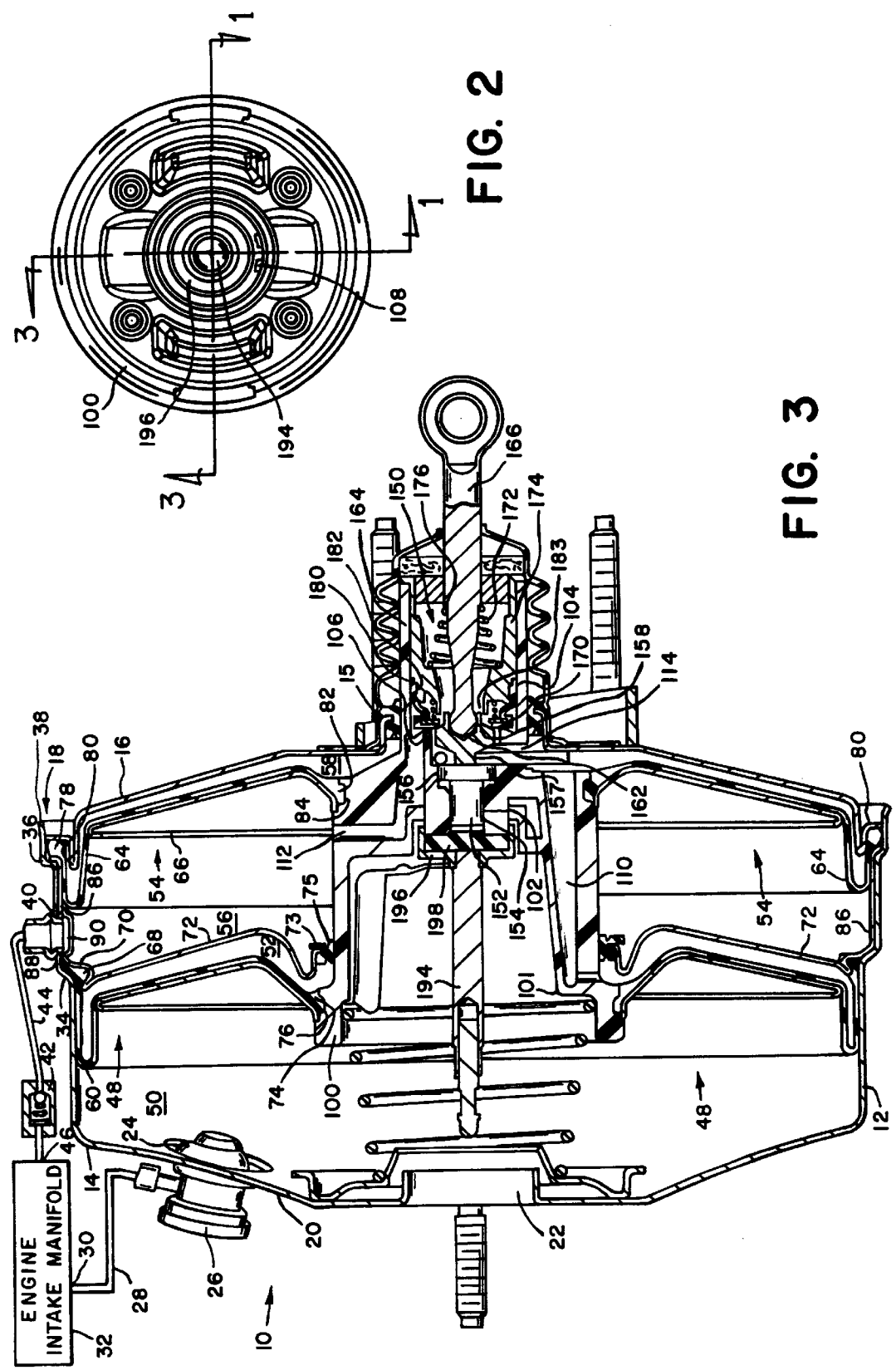

TANDEM VACUUM BRAKE BOOSTER

This invention relates to a tandem vacuum brake booster having first and second communication means connected with a source of fluid pressure to maintain a fluid pressure within the brake booster at an operational level in the event one of the first and second communication means should become inoperative to thereby assure the availability of operational fluid through which a force may be developed to effect a brake application.

BACKGROUND OF THE INVENTION

U.S. Pat. No. 5,233,911 discloses a typical tandem brake booster through which a force is developed to effect a brake application. In such a brake booster, the interior is divided into first and second front chambers and first and second rear chambers by corresponding first and second walls. The first front chamber is externally connected to a first source of fluid pressure by a conduit and internally directly connected to the second front chamber and to the first and second rear chambers by various passages in a hub associated with the first and second wall. A control valve located in the hub is positioned such that the first fluid pressure is communicated in the first and second rear chambers to define a rest or ready position. In responsive to an input force, the control valve is positioned such that a second fluid pressure is presented to the first and second rear chambers to create a pressure differential across the first and second walls. This pressure differential acts on the first and second walls to develop an output force to assist in effecting a brake application. On termination of the input force, a spring returns the control valve to a rest or ready position of the first mode of operation as the second fluid is evacuated from the first and second rear chambers to allow the first fluid pressure to again be present in the first and second rear chambers. This type vacuum brake booster functions in an adequate manner to provide an assist in effecting a brake application.

As long as the operational fluid is communicated to the front chamber such vacuum brake boosters function to provide an assist in effecting a brake application, however, should a source of operational fluid be unavailable as when a vehicle is not operating or should a leak occur in the communication conduit the ability to create a pressure differential is diminished or terminated. In order to overcome such occurrences and still be able to effect a brake application, an internal accumulator chamber has been disclosed in U.S. Pat. No. 4,453,450 to provide a reserve source of operational fluid. However the increase in weight for the housing and structural complexity for the valving associated with the operation of the reserve source of operational fluid for such a vacuum brake booster has not been a commercial accepted product.

The same lack of commercial success could be attributed to a tandem brake booster disclosed in U.S. Pat. No. 3,813,992 where two single brake boosters are sequentially joining together. Additionally. the space required to accommodate such a dual arrangement have not been available with respect to most currently manufactured vehicles.

SUMMARY OF THE INVENTION

A primary object of the present invention is to provide a compact tandem brake booster characterized by a hub arrangement through which a first fluid is independently supplied to first and second front chambers and thereafter internally communicated to first and second rear chambers, respectively. A control valve functions to selectively direct a second fluid with first and second rear chambers to create an operational pressure differential and develop an output force across first and second walls in response to an input force.

According to this invention, the tandem brake booster has a housing with a first front chamber separated from a first rear chamber by a first wall and a second front chamber separated from a second rear chamber by a second wall. The first and second front chambers are connected to the first and second rear chambers depending on the functional position of a control valve within an axial bore of a hub member. In a first mode of operation or position of the control valve, the first fluid as supplied to the first and second front chambers and communicated to the first and second rear chambers results in a substantially identical fluid pressure within the housing to produce a rest or ready position for the control valve. In a second mode of operation, the control valve responds to an input force by moving from the rest or ready position to allow a second fluid pressure to be communicated to the first and second rear chambers and create an operational pressure differential between. The pressure differential develops an output force which moves the first and second walls as a function of the input force applied to the control valve. The control valve on termination of the input force returns to the ready mode of operation as the second fluid pressure is replaced in the first and second rear chambers by the first fluid pressure. The control valve is characterized by being located in an axial bore of the hub member. The axial bore forms a junction for first and second passages in the hub which connect the first front chamber with the first rear chamber to define a first flow path and third and fourth passages in the hub which connect the second front chamber with the second rear chamber to define a second flow path. The first and second flow paths independently allow the second fluid pressure to be simultaneously eliminated from the first and second rear chamber and the first fluid pressure to return thereto as the control valve returns to the ready mode of operation.

An advantage of this invention provides over current tandem vacuum brake boosters occurs through the independent communication of a first fluid to a first front and rear chambers and second front and rear chambers though separate flow paths to provide assurance that a pressure differential can be created to developed an output force.

A further advantage of this invention is provided through the independent communication of a first source of fluid to first and second front chambers to assure the availability of an operational fluid whereby a pressure differential may be created in response to an input force applied to a control valve to effect a desired braking application.

BRIEF DESCRIPTION OF THE DRAWINGS

FIG. 1 is a sectional view of a tandem brake booster taken along lines 1—1 of FIG. 2 illustrating a first flow path for communicating fluid between a first front chamber and a first rear chamber made according to the principals of the invention;

FIGS. 2 is a front end view of a hub member for the present invention; and

FIG. 3 is a sectional view of the tandem brake booster taken along line 3—3 of FIG. 2 illustrating a second flow path for communicating fluid between a second front chamber and a second rear chamber made according to the principals of the invention.

DETAILED DESCRIPTION

The tandem brake booster 10 illustrated in FIG. 1 has a housing 12 formed by joining a first shell 14 with a second shell 16 through a series of locking projections 18 (only one of which is shown). The first shell 14 has a end wall 20 with an axial opening 22 therein for receiving a master cylinder, a first opening 24 for receiving a first one-way (check valve) valve 26 and a second opening 40 for receiving a second one-way (check valve) valve 42. The first shell 14 has a cylindrical body with first shoulder 34 located approximate mid-way from the end wall 20 and a second shoulder 36 adjacent the open end 38. The first one-way valve 26 is connected by a first conduit 28 to a first connection 30 on an intake manifold 32 of a vehicle. The second one-way valve 42 is connected by a second conduit 44 to a second connection 46 on the intake manifold 32 of the vehicle. Thus, the source of vacuum is derived from two separate areas of the vehicle and as a result the optimum operational fluid should be available to be presented to the vacuum brake booster 10.

The interior of housing 12 is divided by a partition 72 and a first wall means 48 into a first front chamber 50 and a first rear chamber 52, and by the partition 72 and a second wall means 54 into a second front chamber 56 and a second rear chamber 58. The first wall means 48 includes a diaphragm 60 and a backing plate 62 and the second wall means 54 includes a diaphragm 64 and backing plate 66. Diaphragm 60 has a first bead 68 which is retained by a groove 70 in the partition 72 which separates the first rear chamber 52 from the second front chamber 56 and a second bead 74 retained in a groove 76 on a cylindrical body 102 of a hub 100 for a valve body which is connected to the first wall means 48 and second wall means 54. Diaphragm 64 has a first bead 78 retained between the second shoulder 36 on the first shell 14 and a peripherial ledge 80 on shell 16 and a second bead 82 which is retained in groove 84 on the cylindrical body 102 of hub 100. The partition 72 has a cylindrical body 86 which extends in a perpendicular direction from a disc 89. Disc 89 has an axial opening 73 with a corresponding seal 75 that surrounds hub 100. Cylindrical body 86 which is concentric with that portion of shell 14 between first shoulder 34 has an opening 88 is aligned with opening 40 in shell 14. A restriction 90 is associated with opening 88 to prevent the diaphragm 64 from being pulled into the opening 88 in response to a pressure differential between the fluid pressure in chambers 56 and 58.

The hub 100, as illustrated in FIGS. 1, 2 and 3, is characterized by a cylindrical body 102, a portion of which is located with the housing 12 and a portion which extends through an opening 15 in shell 16 to be located outside of the housing 12. The cylindrical body 102 has a stepped axial bore 104 with an annular seat 106. The front end 101 of the stepped axial bore 104 is designed to receive a housing of a master cylinder while the rear end 103 is designed to receive a control valve 150, as later described. The cylindrical body 102 has a first passage 108, see FIG. 1, which extends past an annular seat 106 to connect the first front chamber 50 with the axial bore 104, a second passage 110, which connects the axial bore 104 with the first rear chamber 52, a third passage 112, see FIG. 3, which extends past the annular seat 106 to connect the second front chamber 56 to the axial bore 106 and a fourth passage 114 which connects the axial bore 104 with the second rear chamber 58. The annular seat 106 forms a junction within the axial bore 104 for the first 108, second 110, third 112 and fourth 114 passages which connect the first 50 and second 56 front chamber with the first 52 and second 58 rear chambers. The first passage 108, axial bore 104 and third 112 passage define a first flow path as illustrated in FIG. 1 while the second passage 110, axial bore 104 and fourth passage 114 define a second flow path as illustrated in FIG. 2, the first and second flow path allowing for essentially simultaneously communication of fluid within the interior of housing 12. The communication of fluid within the housing is controlled by the position of the control valve 150 in axial bore 104.

The control valve 150 includes a plunger 152 with a cylindrical body having at least a first diameter 154, a second diameter 156, a third diameter 157 and a fourth diameter 158. The first diameter 154 and second diameter 156 engage corresponding diameters within the axial bore 104 while the third diameter 157 and fourth diameter 158 are smaller that the diameter of the adjacent axial bore. An annular radial seat 160 which is formed adjacent the end of the plunger 152 and extends to the fourth diameter 158. A socket 162 formed in the axial center of the plunger 152 receives a spherical head 164 on an input push rod 166. A key 168 located in a slot which is part of the fourth passage 114 engages the plunger 152 between the second diameter 156 and third diameter 157 to retain plunger 152 in the axial bore 104. The plunger 152 is urged toward a poppet member 170 by a return spring 172 located between an air flow guide 174 and a shoulder 176 on push rod 166.

The poppet member 170 includes a diaphragm 178 with a first end 180 retained in a groove 182 in the air flow guide 174 and a second end 184. A spring 188 acts on the second end 184 of the diaphragm 178 to urge a face 186 toward the annular seat 106 in axial bore 104 and seat 160 on plunger 152.

The booster 10 further includes a return spring 190 located in the first front chamber 50 which acts on hub 100 to position the first and second wall 48 and 54 in a rest positions as illustrated in FIGS. 1 and 3.

An output push rod 192 has a shaft 194 with a head 196 thereon which surrounds a reaction disc 198 positioned within the axial bore 104 of hub 100 to receive the output force developed by a pressure differential acting on the first wall means 48 and second wall means 54 as a result of the operation of control valve 150 responding to an input force applied to push rod 166.

MODE OF OPERATION OF THE INVENTION

When an internal combustion engine is operating in a vehicle, vacuum is produced at the intake manifold 32. This vacuum has a first fluid pressure which is communicated through conduit 28 to the first front chamber 50 and through conduit 44 to the second front chamber 56.

In a first or ready mode of operation, control valve 150 is positioned as shown in FIGS. 1 and 3 with face 186 on the end 184 of diaphragm 178 engaged with annular seat 106 to seal passages 108 and 112 from axial bore 104 and engaged with seat 160 on plunger 152. In this mode of operation, the fluid pressure in the first 50 and second 56 front chambers and first 52 and second 58 rear chambers are essentially identical.

In order to develop an output force to effect a brake application, an input force is applied to push rod 166 which moves plunger 152 after overcoming return spring 172 such that seat 160 moves from face 186 on the end 184 of poppet member 170 to allow air or the second fluid to flow along guide 174 from the atmosphere through annular opening 183 around the fourth diameter 158 of the plunger 152 and into passages 114 and 110 to the first 52 and second 58 rear chambers. With air or the second fluid in the first 52 and second 58 rear chambers, a pressure differential is created across the first 48 and second 54 walls with the first fluid pressure (vacuum) in the first 50 and second 56 front chambers. This pressure differential acts on the first 48 and second 54 walls to develop a force which is transferred through the cylindrical body 102 of hub 100 to the output push rod 192 by way of the reaction disc 198. This output force is a function of the input force as applied to push rod 166 and is utilized to actuate the master cylinder to provide the wheel brakes with pressurized hydraulic fluid to effect a brake application.

On termination of the input force to push rod 166, return spring 162 moves seat 160 into engagement with 186 on the end 184 of poppet member 170 to terminate the communication of air through opening 183 into the axial bore 104. The force of return spring 172 has sufficient strength when seat 160 is engaged with face 186, to also move face 186 off of seat 106 to allow communication between the axial bore 104 and the first passage 108 to the first front chamber 50 and the second passage 112 to the second front chamber 56 such the air in the first 52 rear chamber is evacuated along a first flow path and air in the second 58 rear chamber is evacuated along a second flow path to return the fluid pressure therein to the first fluid pressure and reestablish the read mode of operation. The first and second flow paths provide a means for simultaneously removing the second fluid (air) from the first 52 and second 58 rear chambers to rapidly return the vacuum brake booster 10 to the ready position.

In the event that either conduit 28 or conduit 44 is damaged or actually fails such as may occur it cut or actually removed at either the intake manifold 32 or in front of either one-way valve 26 or 42, initially the fluid pressure in the first 50 front chamber and second 56 front chamber 56 are at the first fluid pressure. After an input force is applied to push rod 166 to effect a brake application terminates and return spring 166 has moved plunger 152 and face 186 off annular seat 106, air is evacuated from the first 58 and second 52 rear chambers. For this example it will be assumed that vacuum is not longer available at one-way valve 26 and as a result air from the first 52 and second 58 rear chambers as presented to axial bore 104 will be evacuated along the second flow path, i.e. passage 112, second front chamber 56, opening 40, one-way valve 42 and conduit 44 to manifold 32. Because of the junction of passages 110 and 114 in axial bore 104, air is evacuated from both the first 52 and second 58 rear chambers to reestablish the fluid pressure therein to a level as found in the second front chamber 56. Due to the length of time and distance that the air is required to flow from the first rear chamber 52 the actual fluid pressure in the second front chamber 56 and second rear chamber 58 are not necessarily equal, however, a sufficient difference in fluid pressure will still be achieved with the pressure of the second fluid (air) to create a pressure differential to develop an output force to effect a brake application within a desired time corresponding to an input force applied to push rod 166.

Essentially the same sequence described above would apply in the example where a failure occurs in conduit 44 and vacuum would not be available in the second front chamber 56. The invention overcomes a possibility of not having a power assist to effect a brake application by having separate sources of operational fluid supplied to a brake booster 10 to assure a pressure differential can be created to develop an output force corresponding to an input force.

I claim:

1. In a tandem brake booster having a first wall and second wall which simultaneously move in response to an operational force developed between a pressure differential created between a first fluid pressure in first and second front chambers and a second fluid pressure in first and second rear chambers, said operational force overcoming a force of a return spring to produce an output force as a function of an input force applied to a control valve, said control valve being located in a hub member, said hub member being characterized by a cylindrical body having an axial bore with an internal annular seat and first, second, third and fourth passages, said annular seat being respectively connected with said first and second front chambers by said first and third passages, said axial bore being connected with said first and second rear chambers by said second and fourth passages, actuation means located in said axial bore and connected to receive said input force, said control valve responding to said input force in a first mode of operation whereby a poppet member is urged toward said annular seat to seal said first and third passages from said axial bore and allow said second fluid pressure to be presented to said first and second rear chambers to develop said operational pressure differential and in a second mode of operation whereby a plunger member engages said poppet member to initiate communication between said first front chamber and said first rear chamber through a first flow path defined by said first passage, axial bore and second passage and to initiate communication between said second front chamber and said second rear chamber through a second flow path defined by said third passage, axial bore and fourth passage to simultaneously and independently remove said second fluid from said first and second rear chambers and equalize the fluid pressure therein to a level of said first fluid pressure.

2. In the tandem brake booster as recited in claim 1 wherein said first and second flow paths are further characterized by first and second conduits which are separately connected to a first source of fluid having said first pressure for independently communicating said first fluid pressure to said first and second front chambers.

3. In the tandem brake booster as recited in claim 2 wherein said axial bore forms a junction for said first and second flow paths to assure that said first fluid pressure is presented to said first and second front chambers should a single failure occur in either of said first and second conduits.

4. In the tandem brake booster as recited in claim 3 further including first and second one way valves for preventing flow communication into said first and second front chambers from said first and second conduits.

5. In a tandem brake booster having a first front chamber separated from a first rear chambers by a first wall and a second front chamber separated from a second rear chamber by a second wall, said first and second front chambers being connected to said first and second rear chambers through a hub and flow communication being controlled by control valve means, said first and second front and rear chambers in a ready mode of operation and in an actuation mode of operation having a substantially identical first fluid pressure, said control valve responding to an input force to allow communication of a second fluid pressure to said first and second rear chambers to create a pressure differential between said first fluid pressure in said first and second front chambers and said second fluid pressure in said first and second rear chambers, said pressure differential developing an output force which moves said first and second walls as a function of said input force applied to said control valve, said control valve on termination of said input force returning to said ready mode of operation whereby said second fluid pressure is replaced in said first and second rear chambers with said first fluid, said hub being characterized by a cylindrical body having an axial bore connected with first, second, third and fourth passages, said cylindrical body having a seat which forms a junction through which said first and third passages are respectively connected with said first and second front chambers and through which said second and fourth passages are respectively connected with said first and second rear chambers, said first passage, axial bore and second passage defining a first flow path while said third passage, axial bore and fourth passage defining a second flow path, said first and second flow paths allowing said second fluid pressure to be simultaneously and independently evacuated from said first and second rear chambers and return said first and second rear chambers to said ready mode of operation.

6. In the tandem brake booster as recited in claim 5 wherein said first flow path includes a first conduit which connects said first front chamber with a source of fluid having said first fluid pressure.

7. In the tandem brake booster as recited in claim 6 wherein said second flow path includes a second conduit which connects said second front chamber with said source of fluid having said first fluid pressure.

8. In the tandem brake booster as recited in claim 7 wherein said first conduit includes a one-way valve to prevent the communication of fluid pressure toward said first front chamber.

9. In the tandem brake booster as recited in claim 8 wherein said second conduit includes a second one-way valve to prevent communication of fluid pressure toward said second front chamber.

10. In the tandem brake booster as recited in claim 9 wherein said control valve will permit a limited communication between either said first and second flow paths in the event of an obstruction or failure in either corresponding first or second conduit which would impede the communication of the second fluid from the first and second chambers to assure the development of an operational output force.

* * * * *